United States Patent [19]

Sinn et al.

[11] Patent Number: 5,785,013
[45] Date of Patent: Jul. 28, 1998

[54] ELECTRICALLY DRIVEN COOLANT PUMP FOR AN INTERNAL COMBUSTION ENGINE

[75] Inventors: Walther Sinn, Anrath; Frank Langner, Würselen; Wolfgang Weller, Gersdorf; Wolfgang Zacher, Döbeln; Jens Teubel, Waldheim; Ronald Rathke, Döbeln, all of Germany

[73] Assignee: Pierburg AG, Neuss, Germany

[21] Appl. No.: 759,425

[22] Filed: Dec. 5, 1996

[30] Foreign Application Priority Data

Dec. 7, 1995 [DE] Germany .................. 195 45 561.4

[51] Int. Cl.⁶ .................................................... F01P 5/10
[52] U.S. Cl. ................... 123/41.44; 417/366; 417/423.14
[58] Field of Search ..................... 123/41, 44; 417/366, 417/423.14

[56] References Cited

U.S. PATENT DOCUMENTS

| | | | |
|---|---|---|---|
| 2,942,555 | 6/1960 | Pezzillo | 417/423.14 |
| 4,310,142 | 1/1982 | Ludwig | 251/30 |
| 4,668,898 | 5/1987 | Harms | 318/254 |
| 4,836,147 | 6/1989 | Morris | 123/41.44 |
| 5,079,488 | 1/1992 | Harms | 318/471 |
| 5,146,126 | 9/1992 | Hutchins | 318/156 |
| 5,195,494 | 3/1993 | Tuckey | 123/514 |
| 5,398,655 | 3/1995 | Tuckey | 123/456 |

FOREIGN PATENT DOCUMENTS

| | | | |
|---|---|---|---|
| 200453 | 10/1957 | Austria | 417/366 |
| 2709516 | 3/1995 | France . | |
| 2730526 | 8/1996 | France . | |
| 2057321 | 11/1970 | Germany . | |
| 4008278 | 9/1991 | Germany . | |
| 4222394 | 9/1993 | Germany . | |
| 4301675 | 7/1994 | Germany . | |
| 5-187385 | 7/1993 | Japan | 417/366 |
| 356023 | 9/1961 | Switzerland | 417/423.14 |

*Primary Examiner*—Noah P. Kamen
*Attorney, Agent, or Firm*—Ladas & Parry

[57] ABSTRACT

A pump-motor unit for pumping a coolant for cooling an internal combustion engine in which a centrifugal pump is connected to an electrically commutated d.c. motor to be driven thereby. A power electronic circuit is mounted on a plate and installed in the unit in connection with the d.c. motor to operate the motor in accordance with signals delivered to said power electronic circuit from an external power source. A cooling body is supported in the unit to cool the power electronic circuit by transferring heat from the power electronic circuit to the coolant. The centrifugal pump and the d.c. motor are interconnected through the cooling body.

11 Claims, 1 Drawing Sheet

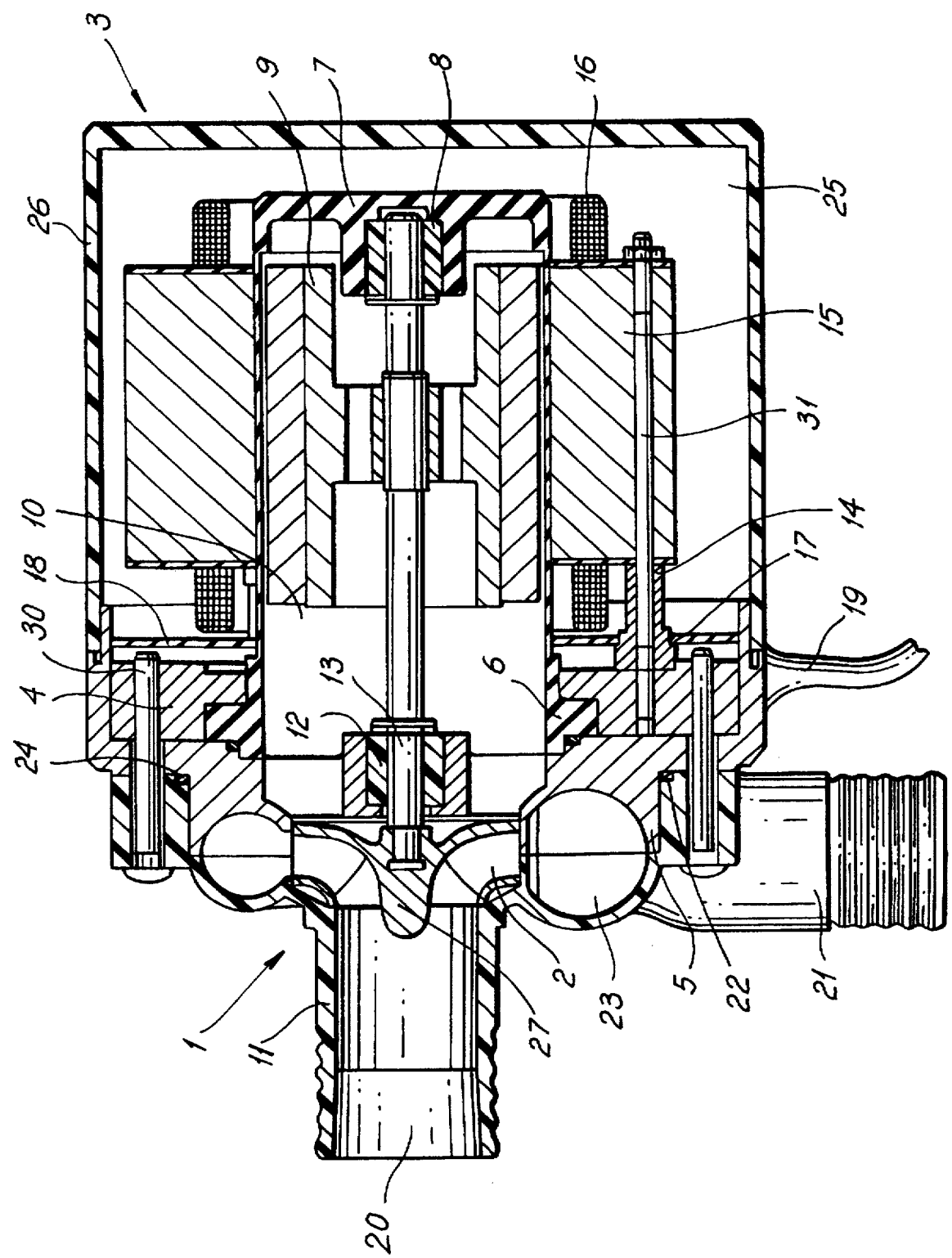

ELECTRICALLY DRIVEN COOLANT PUMP FOR AN INTERNAL COMBUSTION ENGINE

FIELD OF THE INVENTION

The invention relates to electrically driven pumps and particularly to centrifugal pumps driven by electrically commutated d.c. motors.

The invention further relates to such electrically driven pumps for pumping cooling liquids to an internal combustion engines.

BACKGROUND AND PRIOR ART

An electrically driven pump is disclosed in DE-4,008,278, in which the pump rotor is driven by a magnetic coupling in a pump chamber hermetically sealed from the motor chamber. When compared with a pump rotor directly driven by the motor, this pump has a considerably lower efficiency and higher costs for its structural parts.

Another electrically driven pump is disclosed in DE-4,301,675, in which an alternating magnetic field produced in the stator of the motor is transmitted to the rotor by magnetic modulators, whereby the rotor of the motor and the pump rotor are constructed as a single element. This electrically driven pump is used with internal combustion engines of motor vehicles as a so-called residual heat pump to circulate cooling water in only small quantities when the internal combustion engine is turned off.

In order to reduce fuel consumption, especially for three liter engines of intermediate size vehicles, special attention has been given to minimize the power demand of accessory units of the engine. The required power of conventional mechanically driven coolant pumps depends on engine speed. At high engine speeds, the units consume more than 1 kW for an intermediate size vehicle.

The mechanically driven water pump represents a continuous energy utilizer of the internal combustion engine. During idling and, when driving in traffic at partial load, small power losses unfavorably affect fuel economy, since the energy losses are proportionally high in such cases as compared to the required engine power.

In modern diesel engines, there are considerable problems with coolant balance. The power developed, particularly by turbo charged engines, at low rpm, is not sufficient to permit current water pumps to maintain a sufficient temperature of the coolant in the vehicle heating system, due to the speed proportional drive during partial load conditions. Expensive auxiliary heating systems are needed to provide the necessary temperature control for the passenger compartment in such vehicles. In engines that are currently being developed with fuel injection, such as with common-rail injection systems, this problem will most likely be intensified.

In order to obtain optimal engine efficiency, and thus minimum fuel consumption, heat discharge from the engine must be adapted, as accurately as possible, to the engine conditions. The discharged quantity of heat should be high enough so that no damage can occur to the structural parts of the internal combustion engine due to overheating. The prerequisite for an accurate temperature control is a controllable flow of the coolant through the engine.

SUMMARY OF THE INVENTION

An object of the invention is to provide an electrically driven pump which is adapted to control flow of coolant to an internal combustion engine, particularly at high efficiency by controlling the volumetric rate of flow of the coolant.

In order to satisfy the above and further objects of the invention, there is provided an electrically driven pump unit which comprises a centrifugal pump for pumping a coolant, an electrical drive means for driving said pump, said electrical drive means including an electrically commutated d.c. motor and power electronic means connected to said d.c. motor to operate the motor in accordance with signals delivered to said power electronic means from an external source, and a cooling body operatively positioned to cool said power electronic means by transferring heat from said power electronic means to said coolant, said centrifugal pump and said electrical drive means being interconnected through said cooling body.

In further accordance with the invention, the power electronic means comprises a plate containing a power circuit connected to the coil of the d.c. motor and operated by the signals delivered from the external source, said plate being in heat transfer relation with said cooling body which dissipates heat generated by said power electronic means.

BRIEF DESCRIPTION OF THE DRAWING

The sole FIGURE of the drawing is a longitudinal, sectional view through an electrically driven pump unit according to the invention.

DETAILED DESCRIPTION OF A PREFERRED EMBODIMENT

The drawing shows an electrically driven pump unit 1 comprised of a centrifugal pump 2 and an electronically commutated d.c. motor 3. The unit 1 is suitable for use with an internal combustion engine of a motor vehicle to maintain and control coolant circulation according to volumetric flow of the coolant. The unit 1 has flexible coolant tubular connections for supply and delivery of coolant and flexible electrical connections, which will be described later.

According to the invention, the centrifugal pump 2 and the d.c. motor 3 are connected together by means of a cooling body 4. Thereby, a sufficient heat exchange can be obtained between the power electronics for motor 3 and the d.c. motor parts relative to the coolant while additionally, the unit can advantageously be made mass produced, since cooling body 4 forms a connection means between the pump 2 and the motor 3.

A gap forming element 6 made of plastic or other suitable electrically insulative, dielectric material is sandwiched between pump housing 5 and cooling body 4 which are secured by connection bolts 30. The gap forming element 6 is tubular and extends in the magnetic gap of the d.c. 3 motor. The gap forming element 6 has a closed end wall 7 containing a bearing 8 for rotatably supporting one end of the shaft of rotor 9. A rotor chamber 10 is formed within pump housing 5 and element 6 to receive the rotor 9 and cool the same by the coolant in chamber 10. The pump housing 5 is secured between cooling body 4 and a pump cover 11 by bolts 30 and housing 5 incorporates a second bearing 12 for rotatably receiving the other end 13 of the shaft of rotor 9.

By virtue of this construction, the motor 3 is installed by engaging end 13 of the rotor shaft in bearing 12 and securing the housing of the stator 15 of the motor 3 to the cooling body 4 by bolts 31. Bearing 12 in pump housing 5 and bearing 8 in end wall 7 are lubricated by the cooling liquid in the rotor chamber 10.

The housing of the stator 15 is attached by bolts 31 to the cooling body 4 via spacers 14 which have support shoulders 17 for a plate 18 having power electronic circuit means thereon to operate the motor 3. The power electronic circuit means is connected externally to an electrical control device (not shown) by means of a flexible connection cable 19, and internally to a coil 16 of the motor 3 which can be a single phase or multiphase coil.

Due to the arrangement of the power electronic circuit means adjacent to cooling body 4, the heat produced by the power electronic means is dissipated by heat transfer to the cooling body 4.

The cooling body 4 is made of a high heat transfer material, such as a metal as is the housing 5 of the pump to promote heat transfer to the coolant being pumped in the pump. The pump cover 11 is connected to the aforementioned flexible tube (not shown) by means of an inlet fitting 20 for inlet of cooling liquid and an outlet fitting 21 for delivery of pumped cooling liquid. A gasket 22 is secured between pump cover 11 and pump housing 5 to seal pump chamber 23 from the ambient atmosphere.

Advantageously, a gasket 24 is placed between pump housing 5 and gap forming element 6 to seal rotor chamber 10 from a chamber 25 containing the stator of the motor 3, the cooling body 4 and the plate 18. The chamber 25 is closed to the outside by a cap 26 connected to pump housing 5.

In this way, the stator 15 with coil 16, the electronics on plate 18 and cooling body 4 are protected from environmental influences. It may be advantageous to form cooling body 4 integrally in one piece with pump housing 5.

The design of the unit 1 according to the invention, enables its advantageous manufacture, and due to (1) the limiting of the temperature of the structural parts, (2) the minimal air gap in the magnetic circuit between the stator 15 and rotor 9 and (3) the direct transfer of power from the rotor shaft to a pump rotor 27 secured to the rotor shaft, pump 2 and motor 3 operate with optimal efficiency. In addition, the embodiment of the invention leads to a lower cost for structural parts, which also results in its advantageous manufacture. The direct transfer of required power to pump rotor 27, without gasket elements that are associated with wear, leads to a long service life, which is determined only by the service life of the bearings 8 and 12.

Therefore, the pump-motor unit of the invention is suitable for application as a coolant pump for an internal combustion engine of a motor vehicle, whose volumetric flow of coolant is controlled as a function of the temperature of the internal combustion engine by pulse width modulated control signals.

The requirement for a variable flow of the coolant has been resolved in a simple way with the electrically driven pump of the invention. With temperature-dependent control, the pump-motor unit will be activated only if it is necessary for the heat balance of the internal combustion engine.

Design criteria for the pump-motor unit as a coolant pump include the volumetric flow of the cooling liquid necessary to dissipate engine heat at full load and to overcome the flow resistance of the cooling system. Investigations have shown that by optimizing the cooling system, pump power in the range of less than 350 W is sufficient. Since the pump-motor unit is not a continuous energy consuming device and also since it is not driven or is driven only with limited power at critical times for the prevailing conditions of the vehicle (cold starting, idling, slow driving in city traffic), the size of presently used generators and alternators will be sufficient.

The pump-motor unit receives pulse width modulated control signals by means of connection cable 19 (from the motor control means) for stepless speed adjustment of the rotor to control the flow rate of coolant. An optimal speed signal output makes possible a monitoring of pump function during operation or during a diagnostic test.

Although the invention has been described in conjunction with a sole embodiment of the invention, it will become apparent to those skilled in the art that numerous modifications and variations can be made without departing from the scope and spirit of the invention as defined in the attached claims.

What is claimed is:

1. Apparatus for pumping a coolant for cooling an internal combustion engine, said apparatus comprising:

a centrifugal pump for pumping a coolant, electrical drive means for driving said pump, said electrical drive means including an electrically commutated d.c. motor, and electronic circuit means connected to said d.c. motor to operate the motor in accordance with signals delivered to said electronic circuit means from an external power source, and a cooling body operatively positioned to cool said electronic circuit means by transferring heat from said electronic circuit means to said coolant, said centrifugal pump including a pump housing and said electrical drive means including a motor having a stator with a stator housing, bolt means connecting said pump housing and said stator housing together through said cooling body, said cooling body being connected by said bolt means to said pump housing to be cooled by the coolant pumped by the pump, said electronic circuit means being connected by said bolt means to said cooling body in heat exchange relation therewith.

2. Apparatus as claimed in claim 1, wherein said d.c. motor comprises an energizing coil, and a rotor within said stator housing forming a magnetic gap therewith, said apparatus further comprising a tubular element of electrically insulative material extending within said magnetic gap, said tubular element including a closed end wall, and a bearing in said end wall for rotatably supporting one end of a rotor shaft of said rotor.

3. Apparatus as claimed in claim 2, wherein said tubular element includes a portion sandwiched between the cooling body and the pump housing, a second bearing being supported by said pump housing for rotatably supporting an opposite end of the rotor shaft.

4. Apparatus as claimed in claim 3, comprising a pump cover including a coolant inlet and a coolant outlet, said pump cover being sealably mounted on said pump housing.

5. Apparatus as claimed in claim 3, comprising a sealing gasket between said tubular element and said pump housing.

6. Apparatus as claimed in claim 2, comprising spacer elements between said stator housing and said cooling body, said electronic circuit means including a plate mounted on said spacer elements adjacent to said cooling body and connected to said energizing coil and to said external power source.

7. Apparatus as claimed in claim 6, wherein said spacer elements are mounted on said bolt means, said plate being engaged on said spacer elements and including shoulders against which said plate is abutted.

8. Apparatus as claimed in claim 2, wherein said tubular element forms with said pump housing a rotor chamber containing coolant which cools the rotor, said apparatus further comprising a cap secured to said pump housing and forming an external chamber around said stator housing, said cooling body and said electronic circuit means being in said external chamber.

9. Apparatus as claimed in claim 1, wherein said bolt means includes first connection means connecting said pump housing to said cooling body and second connection means connecting said stator of the d.c. motor to said cooling body.

10. Apparatus as claimed in claim 9, comprising a tubular element sealingly connected to said pump housing and extending within a magnetic gap between the rotor and the stator, and means sealingly connecting said tubular element and said pump housing to form a rotor chamber containing coolant.

11. Apparatus as claimed in claim 10, wherein said d.c. motor includes a cap surrounding the stator and the tubular element and engaged with the pump housing to form therewith a chamber containing said stator, said cooling body and said electronic circuit means.

* * * * *